US006598978B2

(12) United States Patent
Hasegawa

(10) Patent No.: US 6,598,978 B2
(45) Date of Patent: Jul. 29, 2003

(54) IMAGE DISPLAY SYSTEM, IMAGE DISPLAY METHOD, STORAGE MEDIUM, AND COMPUTER PROGRAM

(75) Inventor: Masahide Hasegawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/905,065

(22) Filed: Jul. 16, 2001

(65) Prior Publication Data

US 2002/0015137 A1 Feb. 7, 2002

(30) Foreign Application Priority Data

Jul. 27, 2000 (JP) ........................................ 2000-227588
May 16, 2001 (JP) ........................................ 2001-146486

(51) Int. Cl.$^7$ ........................... G03B 21/00; G09G 5/08
(52) U.S. Cl. ......................................... 353/42; 345/158
(58) Field of Search ........................ 353/28, 69, 11, 353/42, 44, 45, 50, 70; 345/39, 42, 32, 56, 156, 158

(56) References Cited

U.S. PATENT DOCUMENTS 6,050,690 A * 4/2000 Shaffer et al. ............... 353/121
6,317,118 B1 * 11/2001 Yoneno ....................... 345/156

* cited by examiner

Primary Examiner—Russell Adams
Assistant Examiner—Andrew Sever
(74) Attorney, Agent, or Firm—Fitzpatrick, Cella, Harper & Scinto

(57) ABSTRACT

An image display system, for displaying an image on a screen in response to a position of a pointer, includes an image display unit for displaying the image on the screen, a detector for detecting coordinates responsive to the position of the pointer, and a display controller. The display controller controls the display to display an image indicating the position pointed by the pointer at position coordinates spaced by a predetermined distance from the position coordinates detected by the detector.

26 Claims, 17 Drawing Sheets

FIG. 4

| SWITCH A | SWITCH B | SWITCH C | SWITCH D | EMISSION | PEN DOWN | PEN BUTTON | CURSOR |
|---|---|---|---|---|---|---|---|
| × | × | — | — | OFF | OFF | OFF | — |
| ○ | × | × | × | ON | OFF | OFF | — |
| ○ | × | ○ | × | ON | ON | OFF | — |
| ○ | × | × | ○ | ON | OFF | ON | — |
| ○ | × | ○ | ○ | ON | ON | ON | — |
| — | ○ | ○ | × | ON | OFF | OFF | LEFT |
| — | ○ | × | ○ | ON | OFF | OFF | RIGHT |

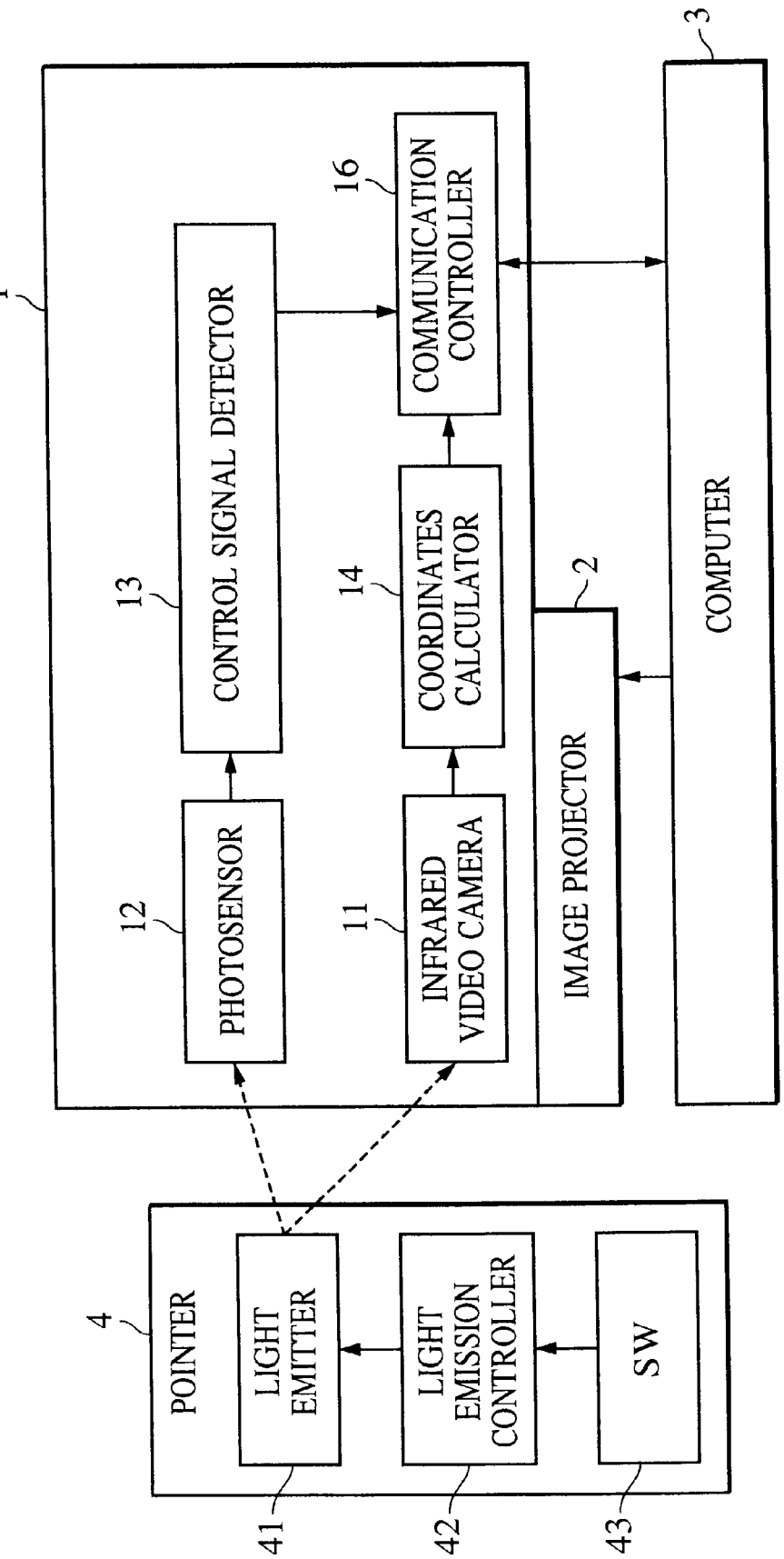

FIG. 10

| SWITCH A | SWITCH B | SWITCH C | EMISSION | PEN DOWN | PEN BUTTON |
|---|---|---|---|---|---|
| × | — | — | OFF | OFF | OFF |
| ○ | × | × | ON | OFF | OFF |
| ○ | ○ | × | ON | ON | OFF |
| ○ | × | ○ | ON | OFF | ON |
| ○ | ○ | ○ | ON | ON | ON |

IMAGE DISPLAY SYSTEM, IMAGE DISPLAY METHOD, STORAGE MEDIUM, AND COMPUTER PROGRAM

BACKGROUND OF THE INVENTION

1. Field of the Invention

The present invention relates to an image display system for presenting an image on a screen in response to a position indicated by a pointer.

2. Description of the Related Art

There are conventionally available projection-type image display systems for use in presentations and conferences. By directly inputting coordinates using a pointer on the screen of a large display, a computer connected to the display is controlled. Characters and drawings are thus input. Some typically available systems incorporate a video camera in a projection-type display apparatus. The video camera picks up an emitter of the pointer, detects the position of the pointer, and a coordinate signal is then sent to the connected computer.

The brightness level on the screen of the projection-type display is raised to a level high enough to be used even in a lighted room. As computers are in widespread use, the demand on the projection-type display apparatus of this sort is mounting. In particular, a front projection apparatus is useful because of its portability, and varying image magnification in response to an available screen size.

However, since an operator needs to use a pointer in front of the screen in the front projection apparatus, the screen is shadowed by the pointer and the operator, and a cursor can become invisible.

SUMMARY OF THE INVENTION

Accordingly, it is an object of the present invention to provide an image display system which is smoothly operated and projects an image which is pointed at by a pointer but not overshadowed by the pointer.

To achieve the above object, in one aspect, an image display system of the present invention for displaying an image on a screen in response to a position of a pointer, includes a projection-type image display unit for displaying the image on the screen, a detector for detecting coordinates responsive to the position of the pointer, and a display controller for displaying an image indicating the position pointed by the pointer at position coordinates spaced by a predetermined distance from the position coordinates detected by the detector.

In a preferred embodiment, the image display system includes a modifier for modifying the predetermined distance.

The modifier is preferably a switch.

The pointer may include a plurality of switches, and a combination of the plurality of switches may determine the direction of the position coordinates at the predetermined distance.

Preferably, the modifier modifies the predetermined distance by pointing to a modification display presented on the screen with the pointer.

A detection area of the coordinate detector may be larger than a display image area on the screen by at least a maximum settable value of the predetermined distance.

Preferably, the display controller controls the predetermined distance in response to the position coordinates detected by the detector.

The display controller may control the predetermined distance in proportion to the distance of the position coordinates detected by the detector from the edge of the screen.

To achieve the above object, in another aspect, an image display system of the present invention for displaying an image on a screen in response to a position of a pointer, includes an image display unit for displaying the image on the screen, and a detector for detecting coordinates responsive to the position of the pointer, wherein the pointer includes a plurality of light emitters with one of a hollow section and a transparent section interposed therebetween.

Preferably, the detector detects the center of light quantity from the emitter as the position coordinates pointed by the pointer.

The light emitter is preferably an optical fiber.

The detector preferably detects a peak value position of the light from the optical fiber as the position coordinates pointed by the pointer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 4 is a table listing operation modes of the pointer of the first embodiment of the present invention;

FIG. 7 is a functional block diagram showing a projection-type image display system of a third embodiment of the present invention;

FIG. 10 is a table listing operation modes of the pointer of the fourth embodiment of the present invention;

DESCRIPTION OF THE PREFERRED EMBODIMENTS

Figure 1:
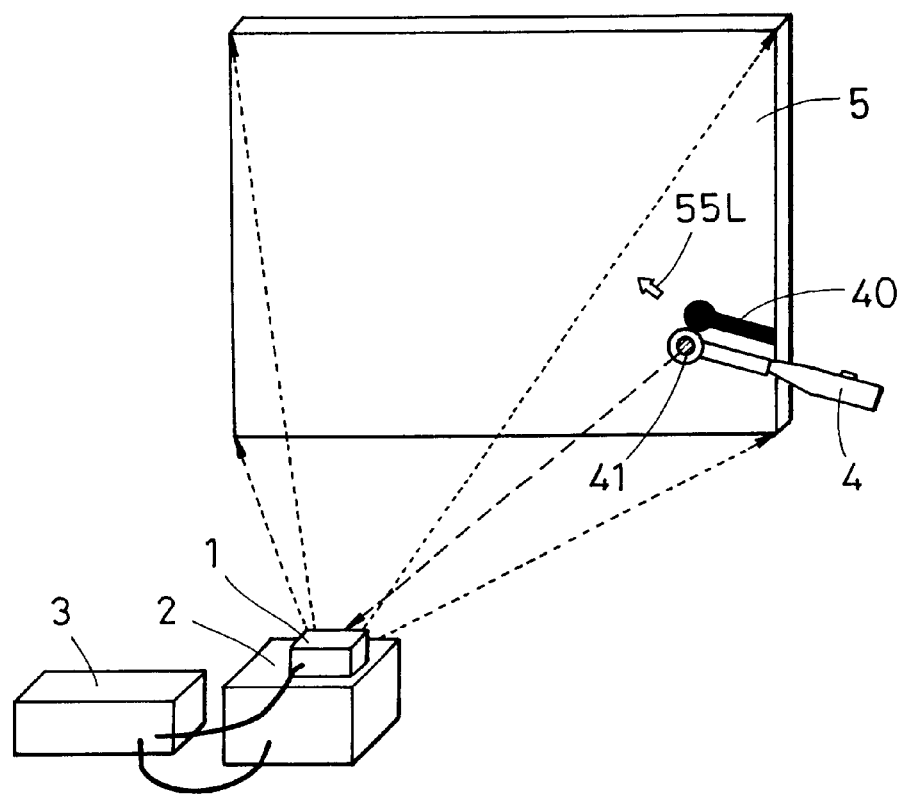
FIG. 1 generally shows a projection-type image display system of a first embodiment of the present invention.

Preferred embodiments of the present invention will now be described in detail in accordance with the accompanying drawings.

The embodiments of the present invention will now be discussed, referring to the drawings.

First Embodiment

Figure 2:
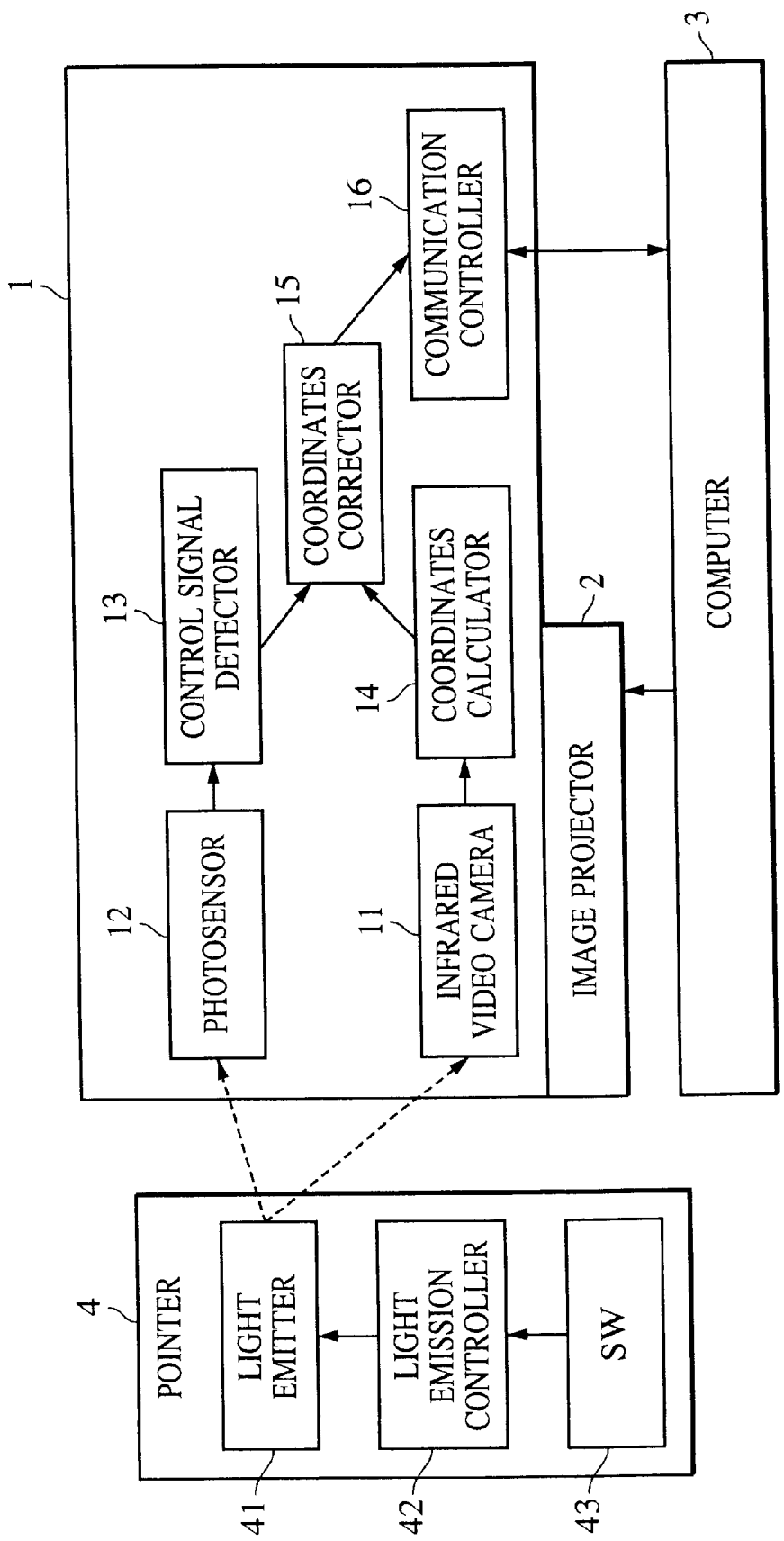
FIG. 2 is a functional block diagram of the projection-type image display system of the first embodiment of the present invention.

FIG. 1 shows an image display system of a first embodiment of the present invention, and FIG. 2 is a functional block diagram of the projection-type image display system of the first embodiment. Each of the elements shown in block outline in the figures are individually well known per se, and their internal construction and operation is not critical to the making or using of this invention or to a description of the best mode of the invention.

Referring to FIG. 1, the image display system includes a projection-type image display apparatus 2, a screen 5 on which an image is presented, a coordinates detector 1 for detecting position coordinates of a light emitter 41 mounted on the end of a pointer 4, and a computer 3. An image signal generated by the computer 3 is input to the projection-type image display apparatus 2, while a control signal and position coordinates of the light emitter 41 detected by the coordinates detector 1 are input to the computer 3. The coordinates detector 1 is mechanically fixed to the projection-type image display apparatus 2. The installation position of the projection-type image display apparatus 2 is adjusted so that an image is projected in a desired location and a desired size on the screen 5.

With reference to FIG. 2, the pointer 4 includes the light emitter 41 composed of red LEDs (Light Emitting Diodes), a light emission controller 42 for controlling light emission of the light emitter 41, and a plurality of operation switches (SW) 43. The light emission controller 42 turns on and off light emission and modulates light in accordance with the status of the four operation switches 43A–43D, thereby performing light emission control with a control signal superimposed on light.

The coordinates detector 1 includes an infrared video camera 11, a coordinates calculator 14 for calculating coordinates from the output signal from the infrared video camera 11, a photosensor 12 and a control signal detector 13 for detecting the control signal from the pointer 4. A communication controller 16 has the function of sending coordinate signals and control signals to the computer 3 and receiving a mode control signal for switching an operational state in response to a command from the computer 3. The coordinates detector 1 also includes a coordinates corrector 15.

The coordinates detector 1 detects the position coordinates of the light emitter 41 and the control signal responsive to the switches, to be discussed later, of the pointer 4, and sends these pieces of information to the computer 3.

In response to an image signal input from the computer 3, the projection-type image display apparatus 2 presents the corresponding image information on the screen 5. The computer 3 superimposes a cursor (a position pointing image) 55L on the image signal, and changes the image location and size of the cursor 55L in response to the coordinate information and the control signal from the coordinates detector 1. The computer 3 thus performs a variety of processes to changes the display image.

Text information and line drawing information are input on the screen 5 by the pointer 4, and then presented by the projection-type image display apparatus 2. The information is input and output as if performed using "a pencil and paper." Further, an input operation using a button and an icon selection is freely performed.

The projection-type image display system of the first embodiment is now specifically discussed.

Detailed Discussion of the Pointer 4

Figure 3:
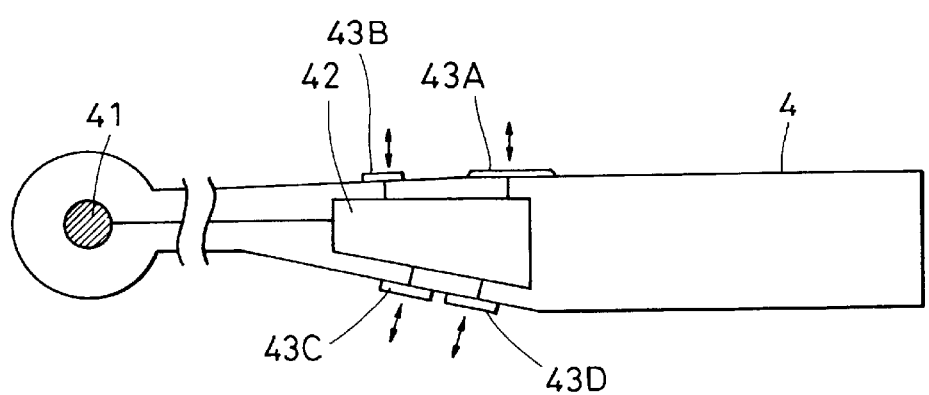
FIG. 3 roughly shows the construction of a pointer of the first embodiment of the present invention.

FIG. 3 roughly shows the construction of a pointer of the first embodiment of the present invention.

Referring to FIG. 3, the pointer 4 includes the light emitter 41 for emitting an infrared light ray, a light emission controller 42 for driving and controlling light emission of the light emitter 41, and four operation switches 43A–43D in the first embodiment. The light emission controller 42 turns on and off light emission and modulates light in accordance with the status of the four operation switches 43A–43D, thereby performing light emission control with a control signal superimposed on light.

The operation mode of the pointer 4 is now discussed, referring to FIG. 4.

FIG. 4 is a table listing operation modes of the pointer of the first embodiment of the present invention.

Switches A–D correspond to switches 43A–43D in FIG. 3. Referring to FIG. 4, "EMISSION" corresponds to a light emission signal (a coordinate signal) and "PEN DOWN" and "PEN BUTTON" correspond to control signals. The modulation of light here is well known in connection with widely used remote controllers, and the discussion thereof is skipped.

The operator holds the pointer 4 in front of the screen 5 with the light emitter 41 pointing to the coordinates detector 1. The operator grips the pointer 4 in a manner such that the thumb of the operator naturally touches the switch 43A. Pressing the switch 43A causes the light emitter 41 to start emission. The coordinates detector 1 operates, outputting a coordinate signal in a predetermined process thereof. In this state, the control signals for a pen down operation and a pen button operation are still off. The screen 5 indicates only the movement of the cursor and the position pointing to the user in a button switching operation for high lighting.

Pressing the switches 43C and 43D, which are positioned to be respectively conveniently touched by the index finger and the middle finger, the control signals for the pen down operation and the pen button operation are superimposed on the emitted light signal. Specifically, with the switch 43C pressed, the pen down state is activated, thereby permitting a text or line drawing to be entered, and further, screen controlling for button selection may be performed. With the switch 43D pressed, the pen button state is activated, and a different function such as calling a menu may be performed. The operator operates the system smoothly and quickly in a single-handed fashion, such as writing a text or drawings at any position on the screen 5, or selecting buttons and menus.

Like the switch 43A, the switch 43B is mounted in a position that permits easy access by the thumb of the operation, and is thus difficult to press together with the switch 43A. This is because there is no need to press the two switches together. Since the switch 43B is less frequently used than the switch 43A, it is preferred that the switch 43B is arranged to be less accessible. When the switches 43C and 43D are pressed with the switch 43B pressed, a signal LEFT or a signal RIGHT is issued with the control signals for the pen down operation and the pen button operation off. The signal LEFT and the signal RIGHT are used to vary the offset that is added to or subtracted from the output coordinates in the coordinates corrector 15, rather than being output from the coordinates detector 1 to the computer 3.

Figure 5:
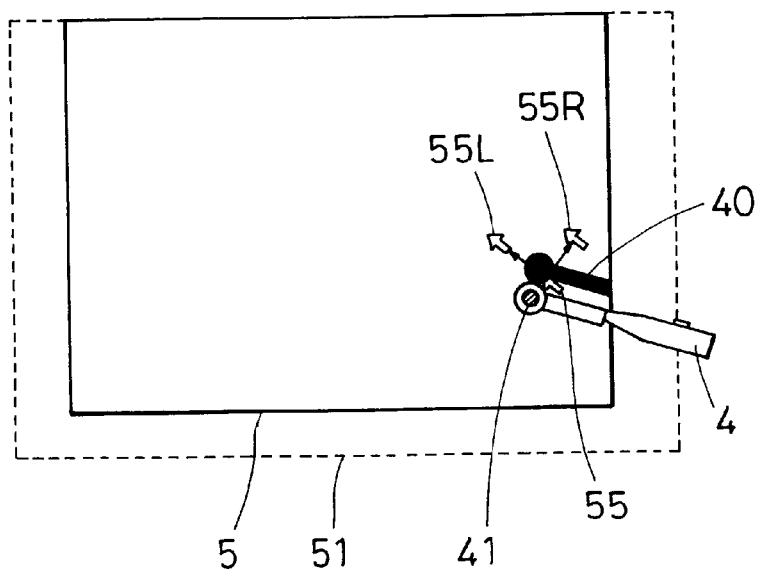
FIG. 5 shows a display screen in accordance with a second embodiment of the present invention.

With the switches 43C and 43D pressed in front of the screen 5, the cursor position is shifted to 55L, 55, or 55R as shown in FIG. 5.

As shown, the cursor 55 at an offset zero position is partly overshadowed by the pointer. With the cursor 55 shifted to 55L or 55R, the cursor becomes fully visible, helping the operator in the curser operation. Depending on whether the operator stands on the right-hand side or on the left-hand side of the screen 5, the operator selects between the cursors 55L and 55R, whichever is easier to handle. In the first embodiment, the operator easily switches between the cursors 55L and 55R on the pointer 4.

Figure 14:
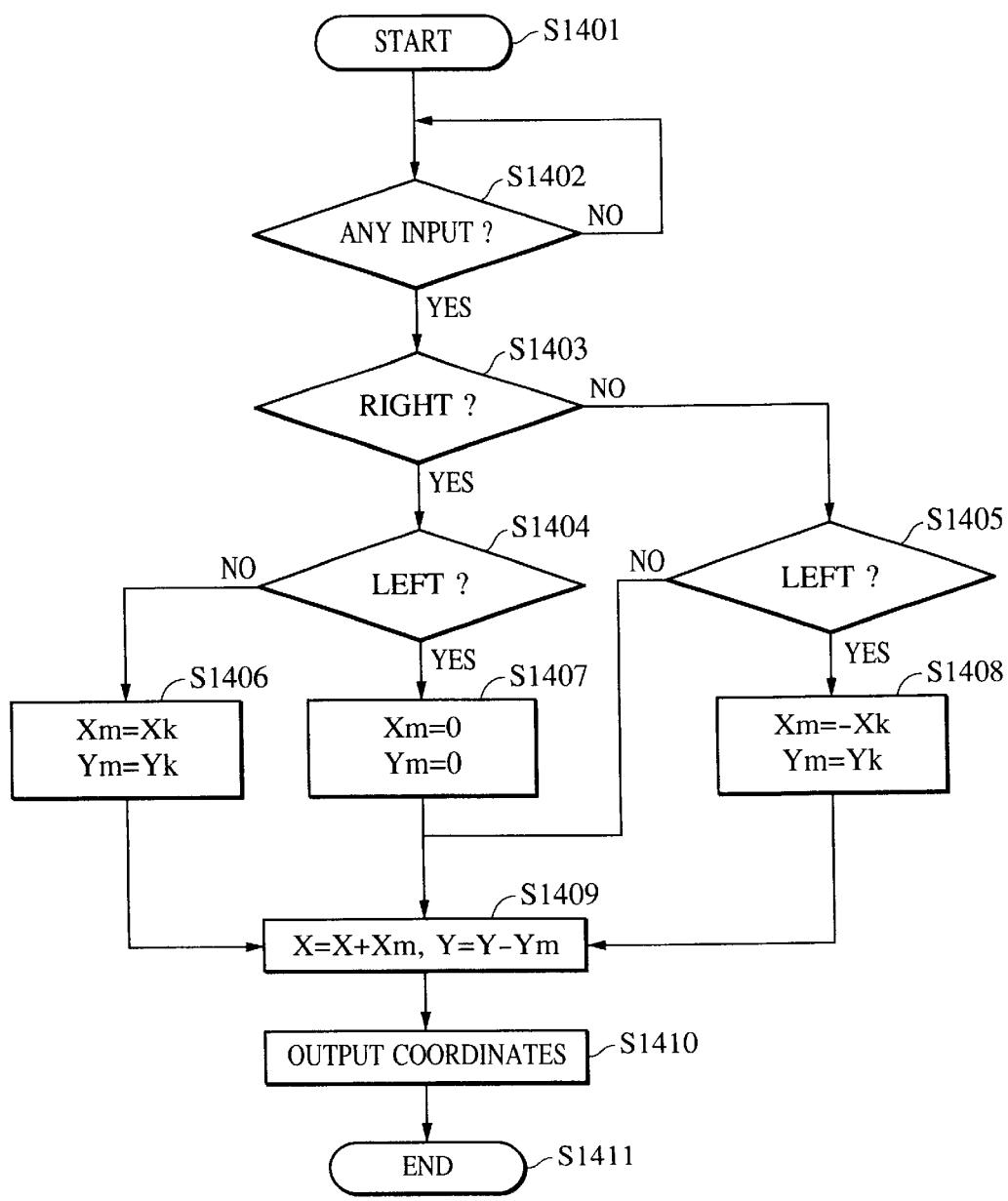
FIG. 14 is a flow diagram showing the process of a coordinates corrector for switching between two types of offsets to the right-hand side and the left-hand side.

Referring to a flow diagram shown in FIG. 14, the process of the coordinates corrector for switching between two types of offsets to the right-hand side and the left-hand side is shown.

As shown, Xk and Yk represent predetermined offsets, and Xm and Ym represent offset variables, having immediately previously set status, and X and Y represents coordinates. The origin of the coordinate system is set at the top left of the screen, and X is positive in the leftward direction, and Y is negative in the downward direction.

When the control signal detector 13 detects a control signal and when the coordinates calculator 14 detects an effective coordinate input signal, it is determined in step S1402 that an input is present. In steps S1403, S1404, and S1405, the status of control signals RIGHT and LEFT is checked. When the signal RIGHT only is on, Xk is substituted for Xm, and Yk is substituted for Ym in step S1406. When the signal LEFT only is on, −Xk is substituted for Xm, and Yk is substituted for Ym in step S1408. When the signals RIGHT and LEFT are on, Xm and Ym are reset to zero in step S1407. When the signals RIGHT and LEFT are off, Xm and Ym are not updated. Using the set Xm and Ym, the coordinates X and Y are updated in step S1409. The coordinate information is transferred to the communication controller 16 in step S1410.

In this way, with the signal RIGHT on, the cursor shifts to the top right, with the signal LEFT on, the curser shifts to the top left, and with both the signal RIGHT and LEFT on, the cursor reverts back its original position. This setting is continuously effective thereafter.

The offset value is one type for each of the leftward and rightward direction. Alternatively, the offset value may be variable. In such a case, the offset value may be gradually changed by repeating the operation of the switches.

Figure 15:
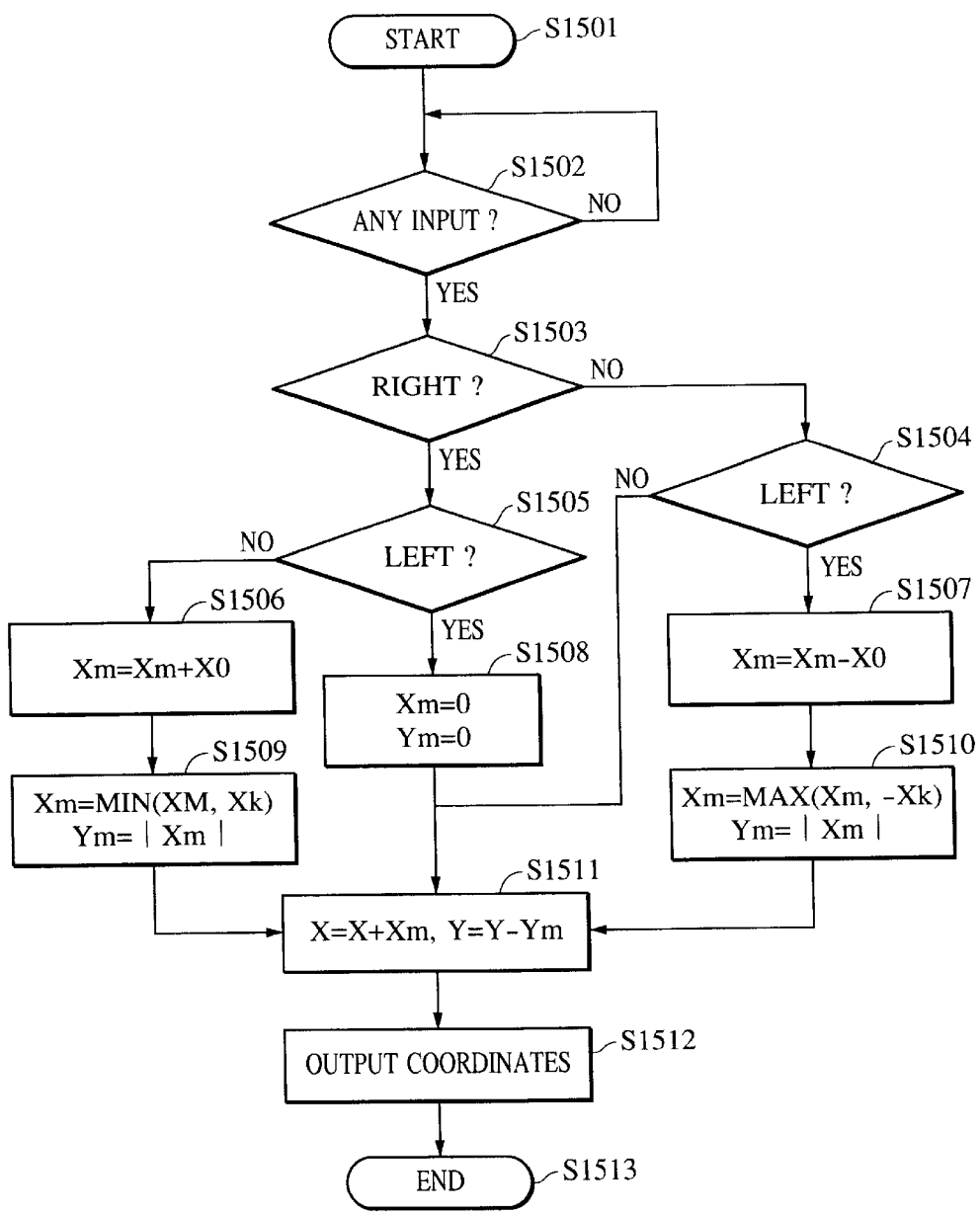
FIG. 15 is a flow diagram showing the process of a coordinates corrector for varying gradually the offset.

Referring to the flow diagram shown in FIG. 15, the process of the coordinates corrector for varying gradually the offset is discussed.

As shown, Xk represents a predetermined maximum offset value, X0 represents a variable offset at one time, Xm and Ym represent offset variables, having immediately previously set statuses, and X and Y represent coordinates. FIG. 15 is different from FIG. 14 in the process subsequent to the examination of the status of the control signals RIGHT and LEFT in steps S1503, S1504, and S1505, and the difference only is discussed here.

When the control signal RIGHT only is on, Xm is increased by X0 in step S1506, and the maximum of Xm is limited so that Xm is equal to or smaller than Xk in step S1509, and Ym is equalized with the absolute value of Xm. When the control signal LEFT only is on, Xm is decreased by X0 in step S1507, the minimum of Xm is limited in step S1510 so that Xm is equal to or larger than −Xk, and Ym is then equalized with the absolute value of Xm. When the two control signals RIGHT and LEFT are on or off, the flow remains unchanged from that in FIG. 14. Using Xm and Ym thus set, the coordinates X and Y are modified in step S1511, and the coordinate values are transferred to the communication controller 16 in step S1512.

In this way, the offset is gradually increased from the top left to top right with the control signal RIGHT on, from top right to top left with the control signal LEFT on. The setting thus applied is continuously effective in the subsequent operation, and concurrently pressing the switches resets the setting.

The same sequence may be performed by using switches and dials, which may be arranged on the coordinates detector 1, rather than using the switches on the pointer 4. For example, the display operation will be smoother if the rate of change per touch in the switches 43C and 43D is set by a dial on the coordinates detector 1, and the offset modification is performed on the switches 43C and 43D on the pointer 4.

The operation of each block in the coordinates detector 1 will be now discussed in detail, referring to FIG. 2.

Detailed Description of the Coordinates Detector 1

The coordinates detector 1 includes the photosensor 12 for receiving a light intensity modulated signal, and the infrared video camera 11 for detecting the direction in which a light beam comes in. The photosensor 12 and the infrared video camera 11 receive the light beam from the light emitter 41 built in the pointer 4.

Operation of the Control Signal Detector 13

The operation of the control signal detector 13 for detecting the control signal in the output signal from the photosensor 12 is identical to the technique widely used in the infrared remote controller. This technique is sufficiently robust to external disturbances and receives a sufficiently high-speed control signal. The control signal received is sent to the coordinates corrector 15.

Operation of Coordinates Calculator 14

An effective display area 51 of the infrared video camera 11 in the first embodiment is slightly larger than the image display area of the screen 5 as shown in FIG. 5. The light emitted by the light emitter 41 within the effective display area 51 appears on an output signal as a peak. First, the light emitter 41 is operated to emit light in the four corners of the screen, and the coordinates calculator 14 stores data serving as a reference for the calculation of the coordinates from the peak position of the output signal from the infrared video camera 11. Any position coordinates of the light emitter 41 is detected referring to the peak position of the output signal from the infrared video camera 11 to calculate the position coordinates.

Operation of the Coordinates Corrector 15

The position coordinates thus obtained are sent to the coordinates corrector 15, where an offset value is added to or subtracted from the position coordinates. The offset position coordinates information is sent together with the control signal from the control signal detector 13 to the computer 3 via the communication controller 16. The coordinates corrector 15 changes the offset in response to the signals LEFT and RIGHT of the control signals, and sends the remaining control signals intact through the communication controller 16. With the above-referenced switching operation of the pointer 4, the cursor and buttons within the presented image are manipulated. The cursor thus may become 55L, 55, or 55R.

When the offset is modified using the switches and dials arranged on the coordinates detector 1 as described above, the coordinates corrector 15 simply detects the offset instead of using the control signals.

The effective display area 51 of the infrared video camera 11 is larger than the display screen by approximately the maximum settable offset value. In this arrangement, no inoperable area occurs within the screen even during the offset operation.

In accordance with the first embodiment, the cursor is not overshadowed by the pointer on the screen. The operator comfortably operates the image display system, adjusting the offset to the operator's own preference. An easy-to-use projection-type image display system thus results.

Second Embodiment

Figure 6A:
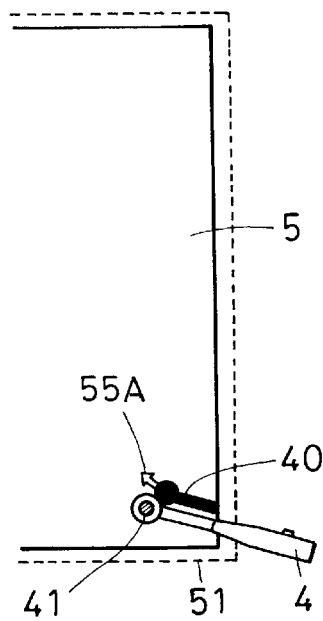
FIG. 6A shows the display screen of the second embodiment of the present invention.
Figure 6B:
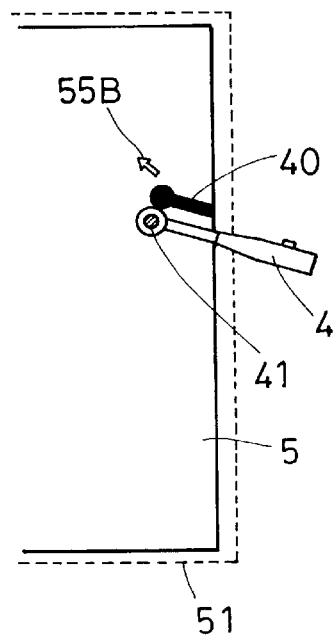
FIG. 6B shows the display screen of the second embodiment of the present invention.

In a second embodiment, the offset is varied according to the location of the cursor within the screen, i.e., the coordinates of the cursor as shown in FIGS. 6A and 6B. Specifically, the offset gradually increases from a constant value in proportion to the distance from the lower edge of the screen in a vertical direction or from the right side edge of the screen in a horizontal direction. Since it suffices to set the effective display area 51 of the infrared video camera 11 larger by a constant value, the second embodiment is advantageous from the standpoint of the optical system of the infrared video camera 11 and the resolution thereof.

Figure 16:
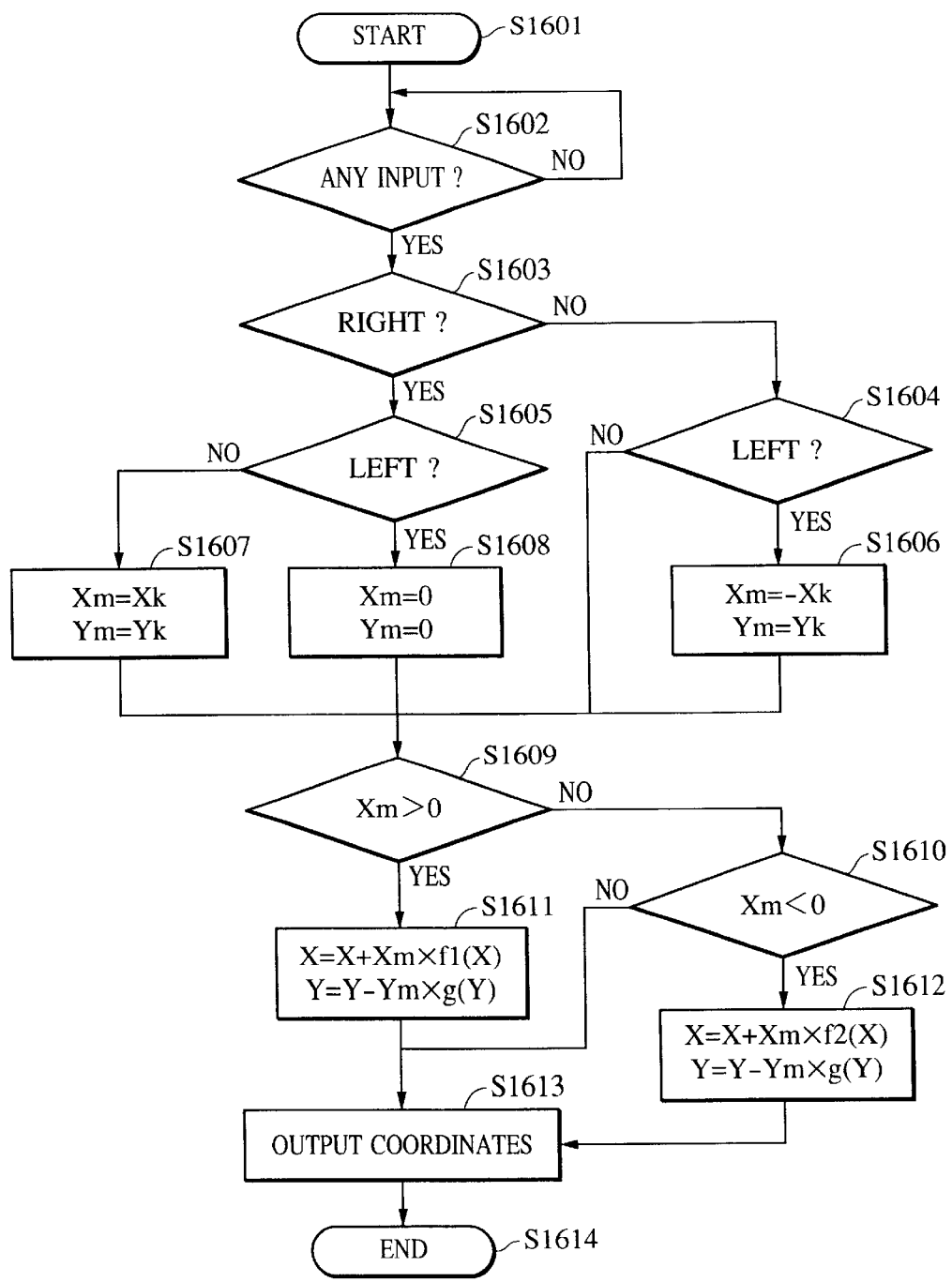
FIG. 16 is a flow diagram showing the process of a coordinates corrector for varying the offset in response to a position within a screen.

With reference to a flow diagram shown in FIG. 16, the process of the coordinates corrector for varying the offset in response to a position within a screen is discussed.

As shown, Xk and Yk are predetermined offsets, Xm and Ym are offset variables, having the immediately previously set statues, and X and Y are coordinates, and f1(X), f2(X), and g(Y) are functions for respectively varying rightward offset, leftward offset, and Y-direction offset depending on the location within the screen. The process in FIG. 16 remains unchanged from the sequence where offset variables Xm and Ym are changed depending on the statuses of the control signals RIGHT and LEFT as shown in FIG. 14. The flow diagram shown in FIG. 16 is different from that shown in FIG. 14 in the sequence in step S1609 and subsequent steps, and the difference only will now be discussed.

The process branches off from step S1609 depending on the sign of the offset variable Xm. When the offset variable Xm is positive, Xm×f1(X) is added to X in step S1611. As X changes from X=0 (at the left edge of the screen) to X=XMAX (at the right edge of the screen), the function f1(X) gradually increases with the maximum value thereof being one. For example, assuming that f1(X)=X/XMAX, the offset increases in proportion to the distance from the left edge of the screen, and reaches the maximum value Xm in the vicinity of the right edge of the screen. A variety of other functions is contemplated, and any appropriate function is acceptable. In the Y direction, Ym×g(Y) is subtracted from Y. As Y changes from Y=0 (the top edge of the screen) to Y=YMAX (at the bottom edge of the screen), the function g(Y) gradually decreases with the maximum value thereof being one. For example, assuming that g(Y)=1−Y/YMAX, the offset increases in proportion to the distance from the bottom edge of the screen, and reaches the maximum value Ym in the vicinity of the top edge of the screen.

When Xm is negative, Xm×f2(X) is added to X in step S1612. Conversely, the function f2(X) gradually decreases as X changes from X=0 to X=XMAX, with the maximum value thereof being one. For example, assuming that f2(X)=1−X/XMAX, the offset increases in proportion to the distance from the right edge of the screen, and reaches the maximum value Xm thereof at the left edge of the screen. The offset in the Y remains unchanged when Xm is positive.

When Xm is zero, X and Y are output intact, and no offsetting is performed. In this way, corrected X and Y coordinates are transferred to the communication controller 16 in step S1613.

In this way, in response to the position within the screen, the control signal RIGHT changes the offset in the top right direction and the control signal LEFT changes the offset in the top left direction.

In the case shown in FIG. 15 where the offset is gradually changed, the process steps in step S1609 thereafter in FIG. 16 are substituted for step S1511 in FIG. 15.

There are a variety of methods for varying the offset in response to the location within the screen, and these methods fall within the scope of the present invention. It is important that inputting be performed over the entire screen without excessively enlarging the effective display area 51 and that the cursor not be overshadowed in the offset motion.

Third Embodiment

Referring to FIG. 7, the coordinates detector 1 does not include a coordinates corrector (as in FIG. 2), and offset control signals are directly output to the computer 3. The driver software in the computer 3 for processing the coordinate signal and the control signal performs coordinate correction. This arrangement presents no problem at all.

Figure 17:
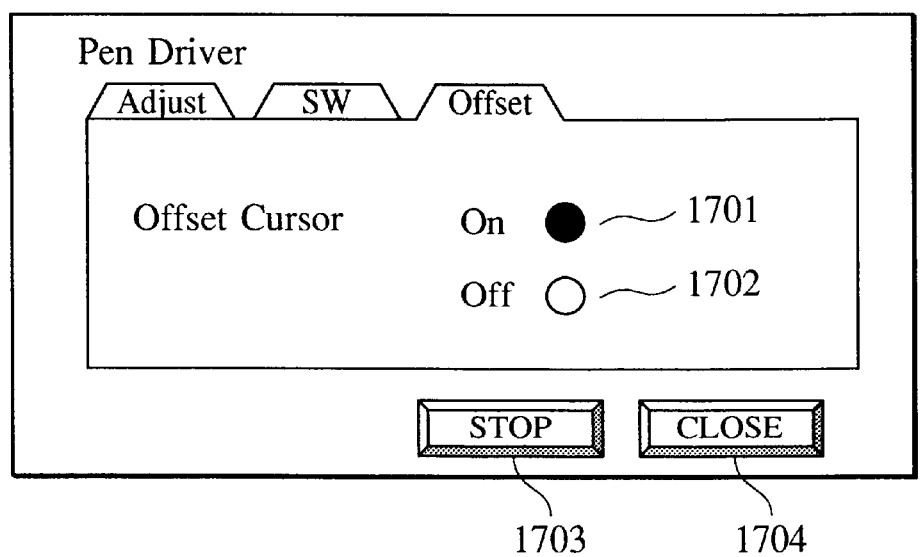
FIG. 17 shows a control window for driver software presented on a screen 5.
Figure 18:
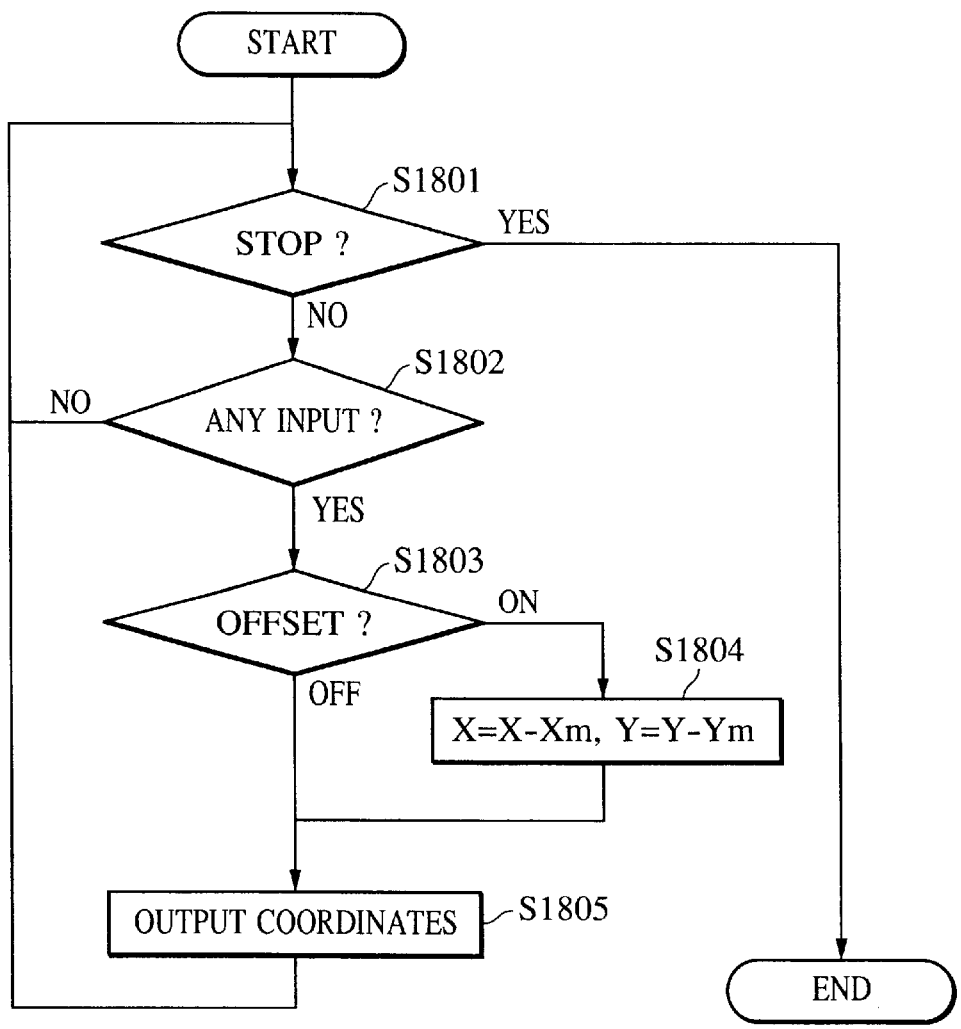
FIG. 18 is a flow diagram in which the offset in a cursor position is controlled using the control window of the driver software shown in FIG. 17.
Figure 19:
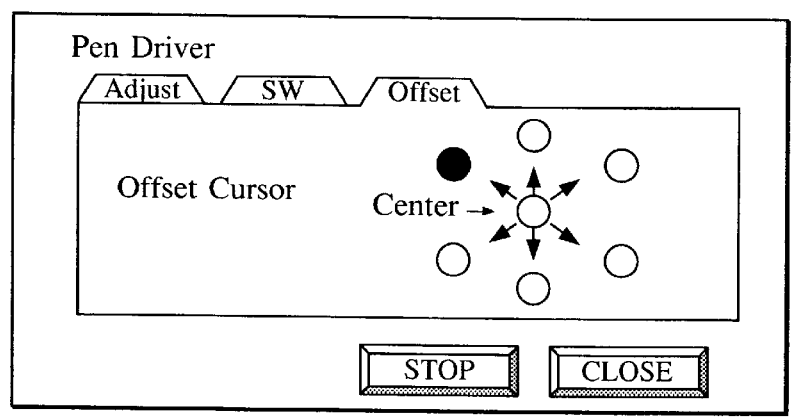
FIG. 19 shows a control window that permits the cursor to be selectively offset in six directions.

Referring to FIGS. 17, 18, and 19, the sequence of the driver software in the computer 3 for controlling the offset of the cursor position is discussed.

FIG. 17 shows a control window of the driver software shown on the screen 5, and switches whether to perform offsetting using on and off buttons. Although the offsetting is performed in one direction only over a constant distance in this case, the distance and direction may be variable. When the on command is designated on the screen, a pen driver recognizes the on command. The pen driver adds an offset to the coordinates sent from the coordinates detector 1. In case of the off command, no offset is added.

FIG. 18 shows a flow diagram for controlling the offset of the cursor position using the control window of the driver software shown in FIG. 17. In step S1801, the computer 3 determines whether a STOP command is entered. When it is determined that the STOP command is entered, the driver software control window ends. When the computer 3 determines that no STOP command is entered, then the computer 3 determines in step S1802 whether there is an output signal from the coordinates detector 1. When it is determined that no output signal is provided by the coordinates detector 1, the process returns to step S1801. When the computer 3 determines that the coordinates detector 1 provides the output, then the computer 3 determines whether OFFSET is on or off (step S1803). When it is determined that the OFFSET is on, the computer 3 outputs, to a system software in a display computer, coordinates that are obtained by subtracting offsets Xm and Ym from the coordinates X and Y set from the coordinates detector 1. When it is determined that the OFFSET is off, the computer 3 outputs, to the system software in the display computer, the coordinates X and Y sent from the coordinates detector 1.

FIG. 19 shows a control window that permits the cursor to be selectively offset in six directions. As shown, the cursor leftwardly upwardly moves in a slanted direction to a black dot.

It is possible that the control by the driver software and the offsetting in the coordinates detector 1 may be concurrently performed.

The control signals LEFT and RIGHT discussed in the first embodiment and the second embodiment may be output to the computer 3, and the driver software in the computer 3, which processes the coordinate signal and the control signals, may also perform coordinate correction. This arrangement is perfectly acceptable.

In accordance with the first through third embodiments, the cursor is displayed using the position coordinates that are spaced apart from the end of the pointer 4 by the predetermined distance so that the cursor may not be overshadowed by the pointer 4. The predetermined distance can be modified using the switches on the pointer 4. Not only the cursor remains visible without being overshadowed by the pointer 4, but also the size of the projected image and the offsetting are adjusted to the operator's own preference.

Fourth Embodiment

Figure 8:
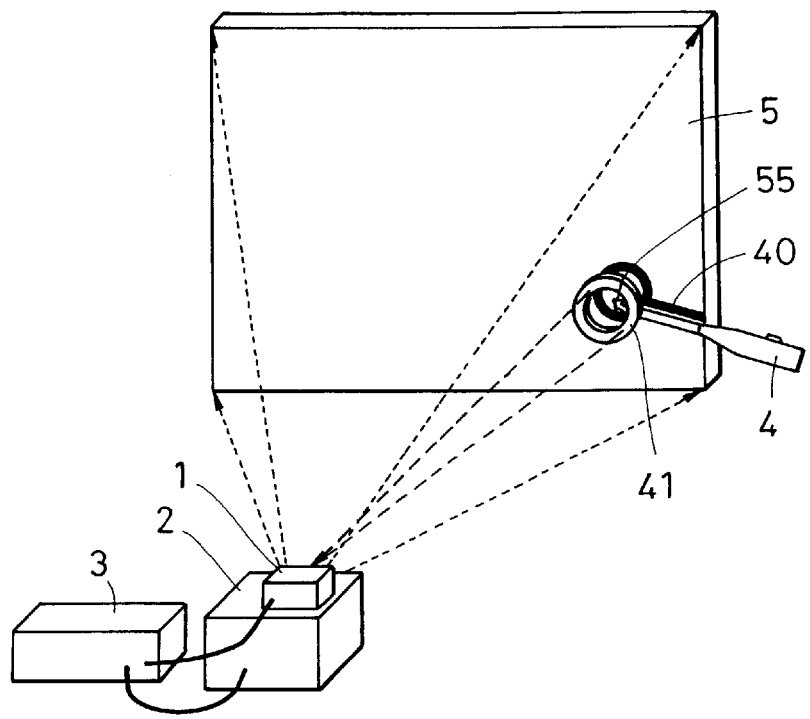
FIG. 8 is an external view of a projection-type image display system of a fourth embodiment of the present invention.

FIG. 8 is an external view of a projection-type image display system of a fourth embodiment of the present invention.

Elements identical to those described in connection with the image display system of the first embodiment are designated with the same reference numerals, and the discussion thereof is skipped. The construction and the function of the elements of the image display system of the fourth embodiment remain unchanged from those of the third embodiment shown in FIG. 7.

The pointer 4 includes three light emitters 41, such as red LEDs. The three light emitters 41 emits light in response to an identical signal. The coordinates detector 1 detects the position coordinates of the light emitter 41, and the control signal responsive to the switch status, to be discussed later, of the pointer 4, and sends these pieces of information to the computer 3.

When receiving an image signal from the computer 3, the projection-type image display apparatus 2 displays the image information onto the screen 5. The computer 3 superimposes the cursor 55 on the image signal. In response to the coordinate information and the control signal from the coordinates detector 1, the computer 3 changes the location and the size of the cursor 55, and modifies a displayed image by performing a variety of processes.

The projection-type image display system of the fourth embodiment will now be discussed in detail.
Description of the Pointer 4

Figure 9:
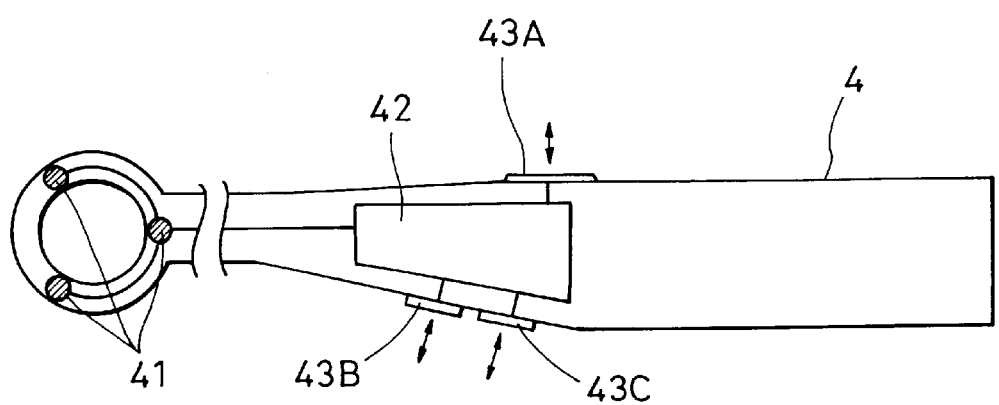
FIG. 9 roughly shows the construction of a pointer of the fourth embodiment of the present invention.

FIG. 9 roughly shows the construction of a pointer 4 of the fourth embodiment of the present invention.

Referring to FIG. 9, the pointer 4 includes the three light emitters 41 emitting infrared light, a light emission controller 42 for controlling the light emission of the light emitters 41, and three operation switches 43A–43C. The three light emitters 41 are arranged on a ring, and the ring has a hollow inner circle as large as possible. The light emission controller 42 turns on and off light emission and modulates light in accordance with the status of the three operation switches 43A–43C, thereby performing light emission control with a control signal superimposed on light.

The operation modes of the pointer 4 are now discussed, referring to FIG. 10.

FIG. 10 is a table listing operation modes of the pointer of the fourth embodiment of the present invention.

Switches A–C correspond to the switches 43A–43C shown in FIG. 9. Referring to FIG. 10, "EMISSION" corresponds to a light emission signal (a coordinate signal) and "PEN DOWN" and "PEN BUTTON" correspond to control signals. The modulation of light is well known in connection with widely used remote controllers, and the discussion thereof is skipped.

The operator holds the pointer 4 in front of the screen 5 with the light emitter 41 pointing to the coordinates detector 1. The operator grips the pointer 4 in a manner such that the thumb of the operator naturally touches the switch 43A. Since the orientation of the light emitter 41 reverses depending on whether the operator stands on the right-hand side of and on the left-hand side of the screen 5, the end portion of the pointer 4 may be set to be turned for switching. Pressing the switch 43A causes the light emitter 41 to start emission. The coordinates detector 1 operates, outputting a coordinate signal in a predetermined process thereof. In this state, the control signals for a pen down operation and a pen button operation are still off. The screen 5 indicates only the movement of the screen 5 and the position pointing to the user in a button switching operation for high lighting.

Pressing the switches 43B and 43C, which are positioned to be respectively conveniently touched by the index finger and the middle finger, the control signals for the pen down operation and the pen button operation are superimposed on the emitted light signal as shown in FIG. 10. Specifically, with the switch 43B pressed, the pen down state is activated, thereby permitting a text or line drawing to be entered, and further, screen controlling for button selection may be performed. With the switch 43C pressed, the pen button state is activated, and a different function such as calling a menu may be performed. The operator operates the system smoothly and quickly in a single-handed fashion, such as writing a text or drawings at any position on the screen 5, or selecting buttons and menus.
Operation of the Coordinates Calculator 14

As in the first embodiment, an effective display area 51 of the infrared video camera 11 is slightly larger than the image display area of the screen 5 in the fourth embodiment. The light emitted by the light emitter 41 within the effective display area 51 appears like a peak of a hilly output signal. The light emitters 41 are successively operated to emit light with the end of the pointer 4 placed on the four corners of the screen, and the coordinates calculator 14 stores data serving as a reference for the calculation of the coordinates from the center of light quantity of the hilly output signal of the infrared video camera 11. Any position coordinates of the light emitter 41 is detected referring to the position of the center of light quantity of the hilly output signal from the infrared video camera 11 to calculate the position coordinates.

The position coordinates thus obtained are sent to the computer 3 together with the control signal from the control signal detector 13. The above-discussed switching operation on the pointer 4 allows the cursor and buttons to be operated on the display screen. The display cursor 55 appears in the same manner when the light emitter 41 is operated in alignment with the four corners of the screen 5 to obtain data as a reference. In the fourth embodiment, the three light emitters 41 are used and the center surrounded by them is hollow. It is natural to align the hollow portion with an image. Since the cursor 55 appears within the hollow portion, the operator comfortably operates the pointer 4 monitoring the cursor 55 without concerning himself with the shadow 40 of the pointer 4.

A transparent member with a cross-hair mark attached may extend in the hollow portion. In this arrangement, the cross-hair mark and the cursor overlap each other, and a fine and detailed work such as writing characters is easily performed. The robustness of the end portion of the pointer 4 is also increased. The use of a transparent member makes the cursor 55 slightly less visible, because the transparency thereof is not 100%. It is advisable to use the transparent member, depending on applications.

Figure 11A:
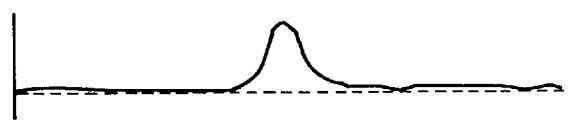
FIGS. 11A–11C are waveform diagrams showing output signals of the pointer.
Figure 11B:

The output signal of the infrared video camera 11 becomes split with a plurality of peaks as shown in FIG. 11(B), depending on the resolution and the focused state of the infrared video camera 11 and the size of the light emission point and the separation between the light emission points of the light emitters 41. If the center of light quantity is used, however, the intermediate point between the light emitters 41 is determined in this case.

A coordinate input device that calculates a position by detecting a peak may suffer from degradation in accuracy, and the present invention is not applicable to such a device.

The posture of the pointer 4 is determined by the manner in which the operator grips the pointer 4. For this reason, the light emitter 41 must be a spreading light source. As the spread angle of the light source becomes wide, the effect of the posture is reduced, but the light intensity drops. An appropriate spread angle needs to be selected. To vary the spread angle, not only the characteristics of the LEDs in the light emitter 41 are selected, but also optical elements such as a diffuser and a lens may be used. When such optical elements are added, the light spot size changes, thereby affecting the output signal of the infrared video camera 11. However, position calculation is performed selecting an appropriate method.

In accordance with the fourth embodiment, the operator comfortably operates the system with the cursor 55 free from being overshadowed by the pointer 4 on the screen 5. An easy-to-use projection-type image display system results.

Fifth Embodiment

Figure 12:
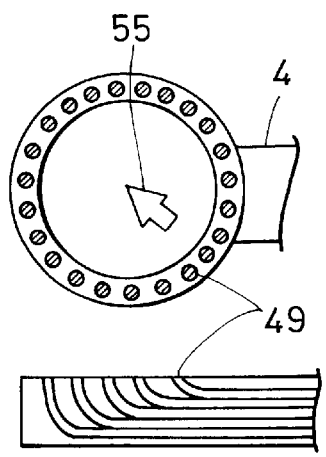
FIG. 12 roughly shows the pointer of a fifth embodiment of the present invention.

FIG. 12 shows the pointer 4 having a ring of light emitters 41 regularly arranged on a circle to which light is guided through optical fibers. In a fifth embodiment, light is substantially equally distributed along the circle, and the output signal of the coordinates detector 1 appears in a smooth hill shape. In this case, the position calculation may be performed on a peak position rather than the center of light quantity.

Sixth Embodiment

Figure 11C:
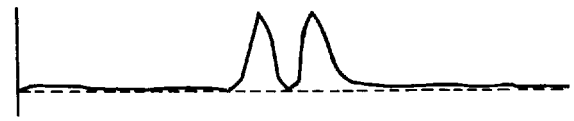
Figure 13:
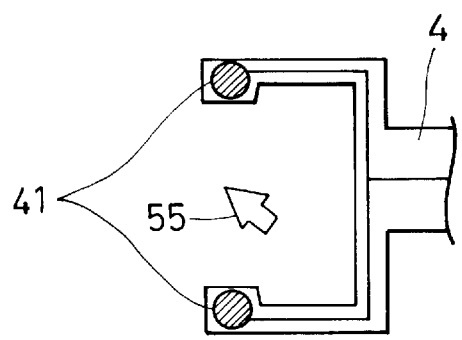
FIG. 13 roughly shows the pointer of a sixth embodiment of the present invention.

FIG. 13 shows the pointer 4 having two light emitters 41. In this case, two separate peaks may result as shown in FIG. 11(C). Depending on the posture of the pointer 4, the spacing between the two peaks changes, and the peak shown in FIG. 11(A) can also result. In this case, as well, the center of light quantity is a midway point between the two light emission points, and the position calculation is performed without any problem. The sixth embodiment uses only two LEDs.

In accordance with the fourth through sixth embodiments, a plurality of light emitters is mounted on the end of the pointer 4, and the center section thereof is hollow, i.e., open, or is provided with a transparent member so that the cursor is not overshadowed by the pointer 4. The center of light quantity is used to calculate the position coordinates. Even if the light emitters are spaced apart from each other, the position within the hollow section or the transparent section is accurately detected.

In the first through sixth embodiments, the coordinates detector 1 employs a video camera. The present invention is not limited to this. Other detectors, such as ones employing an electromagnetic induction method or an ultrasonic method, may be used. Other detectors employing light, for example, a line sensor or PSD (Position Sensing Device) may be equally used.

The computer 3 is used as an image generator. Alternatively, video equipment may be used. The present invention is applicable to any apparatus which receives a coordinate signal and generates an image signal responsive to the coordinate signal.

In accordance with the present invention, the image pointed by the pointer is prevented from being overshadowed by the pointer. A comfortably operable image display system is thus provided.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image display system for displaying an image on a screen in response to a position of a pointer, the image display system comprising:
    projection-type image display means for displaying an image on the screen;
    detector means for detecting coordinates responsive to the position of said pointer; and
    display control means for controlling said display means to display the image indicating the position pointed by said pointer at position coordinates spaced by a predetermined distance from the position coordinates detected by said detector means.

2. An image display system according to claim 1, further comprising modifying means for modifying the predetermined distance.

3. An image display system according to claim 2, wherein said modifying means includes one or more switches.

4. An image display system according to claim 3, wherein said pointer comprises a plurality of said switches, and wherein a combination of said plurality of said switches determines the direction of the position coordinates at the predetermined distance.

5. An image display system according to claim 2, wherein said modifying means modifies the predetermined distance by pointing to a modification display presented on the screen with said pointer.

6. An image display system according to claim 1, wherein a detection area of said coordinate detector means is larger than a display image area on the screen by at least a maximum settable value of the predetermined distance.

7. An image display system according to claim 1, wherein said display control means controls the predetermined distance in response to the position coordinates detected by said detector means.

8. An image display system according to claim 1, wherein said display control means controls the predetermined distance in proportion to the distance of the position coordinates detected by said detector means from an edge of the screen.

9. A method for controlling an image display system for displaying an image on a screen in response to a position of a pointer, the method comprising the steps of:
   indicating a position on the screen with the pointer;
   detecting coordinates responsive to the position of the pointer; and
   controlling a display to display an image indicating the position pointed by the pointer at position coordinates spaced by a predetermined distance from the detected position coordinates.

10. A method for controlling an image display system according to claim 9, further comprising the step of modifying the predetermined distance.

11. A method for controlling an image display system according to claim 10, wherein the modification step modifies the predetermined distance by using one or more switches.

12. A method for controlling an image display system according to claim 11, wherein the direction of the position coordinates at the predetermined distance is determined by a plurality of said switches.

13. A method for controlling an image display system according to claim 10, wherein said modification step modifies the predetermined distance by pointing to a modification display presented on the screen with the pointer.

14. A method for controlling an image display system according to claim 9, wherein a detection area in the detection step is larger than a display image area on the screen by at least a maximum settable value of the predetermined distance.

15. A method for controlling an image display system according to claim 9, wherein said display control step controls the predetermined distance in response to the detected position coordinates.

16. A method for controlling an image display system according to claim 9, wherein said display control step controls the predetermined distance in proportion to the distance of the detected position coordinates from the edge of the screen.

17. A storage medium storing a computer program for controlling an image display system for displaying an image on a screen in response to a position of a pointer, said computer program comprising:
   a program code for a projection-type image display step for displaying the image on the screen;
   a program code for a detection step for detecting coordinates responsive to the position of the pointer; and
   a program code for a display control step for controlling the displayed image to indicate the position pointed to by the pointer at position coordinates spaced by a predetermined distance from the detected position coordinates.

18. A computer program for controlling an image display system for displaying an image on a screen in response to a position of a pointer, said computer program comprising:
   a program code for a projection-type image display step for displaying the image on the screen;
   a program code for a detection step for detecting coordinates responsive to the position of the pointer; and
   a program code for a display control step for controlling the displayed image to indicate the position pointed by the pointer at position coordinates spaced by a predetermined distance from the detected position coordinates.

19. An image display system for displaying an image on screen in response to a position of a pointer, the image display system comprising:
   a pointer for indicating a position on the screen;
   detector means for detecting coordinates responsive to the position of said pointer, wherein the pointer includes a plurality of light emitters with one of a hollow section and a transparent section interposed therebetween; and
   projection-type image display means for displaying the image on the screen based on the detected coordinates.

20. An image display system according to claim 19, wherein said detector means detects a center of light quantity from said emitters as the position coordinates responsive to the position of said pointer.

21. An image display system according to claim 19, wherein said light emitter is an optical fiber, and
   wherein said detector means detects a peak value position of the light from the optical fiber as the position coordinates responsive to the position of said pointer.

22. A method for controlling an image display system which displays an image in response to the position of a pointer, said method comprising the steps of:
   indicating a position on the screen with a pointer;
   detecting coordinates responsive to the position of the pointer, with the pointer including a plurality of light emitters with one of a hollow section and a transparent section interposed therebetween; and
   displaying the image on the screen based on the detected coordinates.

23. A storage medium storing a computer program for controlling an image display system for displaying an image on a screen in response to a position of a pointer, said computer program comprising:
   a program code for a detection step for detecting coordinates responsive to the position of the pointer, wherein the pointer includes a plurality of light emitters with one of a hollow section and a transparent section interposed therebetween; and
   a program code for a projection-type image display step for displaying the image on the screen based on the detected coordinates.

24. A computer program for controlling an image display system for displaying an image on a screen in response to a position of a pointer, said computer program comprising:
   a program code for a detection step for detecting coordinates responsive to the position of the pointer, wherein the pointer includes a plurality of light emitters with one of a hollow section and a transparent section interposed therebetween; and
   a program code for a projection-type image display step for displaying the image on the screen based on the detected coordinates.

25. An image display system for displaying an image on a screen in response to a position of a pointer, the image display system comprising:
   a projection-type image display unit for displaying an image on the screen;
   a detector unit for detecting coordinates responsive to the position of said pointer;
   a coordinate calculator to calculate first position coordinates on the basis of the detected coordinates; and
   a display controller for controlling said display unit to display the image indicating the position, wherein the image is displayed selectively either at the first position coordinates or at second position coordinates spaced by a predetermined distance from the first position coordinates.

26. An image display system for displaying an image on screen in response to a position of a pointer, the image display system comprising:

a pointer for indicating a position on the screen;

a detector unit for detecting coordinates responsive to the position of said pointer, wherein said pointer includes a plurality of light emitters with one of a hollow section and a transparent section interposed therebetween; and a projection-type image display unit for displaying the image on the screen based on the detected coordinates.

* * * * *

UNITED STATES PATENT AND TRADEMARK OFFICE
CERTIFICATE OF CORRECTION

PATENT NO.    : 6,598,978 B2
DATED         : July 29, 2003
INVENTOR(S)   : Masahide Hasegawa It is certified that error appears in the above-identified patent and that said Letters Patent is hereby corrected as shown below:

<u>Column 4,</u>
Line 52, "high lighting." should read -- highlighting. --.

<u>Column 5,</u>
Line 1, "operation," should read -- operator, --.

<u>Column 8,</u>
Line 67, "set" should read -- sent --.

<u>Column 10,</u>
Line 20, "and" should read -- or --.
Line 28, "high lighting." should read -- highlighting. --.

Signed and Sealed this

Twenty-first Day of March, 2006

JON W. DUDAS
*Director of the United States Patent and Trademark Office*